US009710929B2

(12) United States Patent
Huang et al.

(10) Patent No.: US 9,710,929 B2
(45) Date of Patent: Jul. 18, 2017

(54) METHOD AND APPARATUS FOR LOSSLESS IMAGE COMPRESSION

(71) Applicant: Tencent Technology (Shenzhen) Company Limited, Shenzhen (CN)

(72) Inventors: Feiyue Huang, Shenzhen (CN);
Yunsheng Wu, Shenzhen (CN);
Yongjian Wu, Shenzhen (CN);
Shouhong Ding, Shenzhen (CN);
Shang Wu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 295 days.

(21) Appl. No.: 14/716,557

(22) Filed: May 19, 2015

(65) Prior Publication Data

US 2015/0287217 A1    Oct. 8, 2015

Related U.S. Application Data

(63) Continuation of application No. PCT/CN2013/086484, filed on Nov. 4, 2013.

(30) Foreign Application Priority Data

Nov. 19, 2012    (CN) .......................... 2012 1 0468024

(51) Int. Cl.
*G06T 9/00*       (2006.01)
*H04N 19/40*    (2014.01)
(Continued)

(52) U.S. Cl.
CPC ............. *G06T 9/00* (2013.01); *H04N 19/103* (2014.11); *H04N 19/119* (2014.11);
(Continued)

(58) Field of Classification Search
None
See application file for complete search history.

(56) References Cited

U.S. PATENT DOCUMENTS

| 6,121,903 A * | 9/2000 | Kalkstein ............ H03M 7/3086 |
| | | 341/106 |
| 2013/0156309 A1* | 6/2013 | Yao ........................ H04N 19/96 |
| | | 382/166 |

FOREIGN PATENT DOCUMENTS

| CN | 101017533 A | 8/2007 |
| CN | 101109814 A | 1/2008 |

(Continued)

OTHER PUBLICATIONS

Pngcrush—"pngcrush 1.6.6"—May 8, 2008—pp. 1-5.*

(Continued)

*Primary Examiner* — Bernard Krasnic
(74) *Attorney, Agent, or Firm* — Morgan, Lewis & Bockius LLP

(57)    ABSTRACT

The present disclosure discloses method and apparatus for lossless image compression, and relates to the field of computer technologies. The method includes: removing ancillary information and redundant information from a picture having a predefined format in a preset manner; decompressing the picture to restore original picture data of the picture; and setting a compression parameter for the original picture data of the picture and compressing the original picture data of the picture into a picture having the same format before the picture decompression using the compression parameter. According to the present disclosure, ancillary data and redundant data in a picture are removed, and after decompression is performed on the picture, the picture is compressed again according to a preset compression parameter, so that based on lossless compression, a (Continued)

compression rate of the picture is increased, and storage space is saved.

6 Claims, 4 Drawing Sheets

(51) Int. Cl.
  *H04N 19/103* (2014.01)
  *H04N 19/119* (2014.01)
  *H04N 19/186* (2014.01)
  *H04N 19/44* (2014.01)
  *H04N 19/85* (2014.01)

(52) U.S. Cl.
  CPC ........... *H04N 19/186* (2014.11); *H04N 19/40* (2014.11); *H04N 19/44* (2014.11); *H04N 19/85* (2014.11)

(56) References Cited

FOREIGN PATENT DOCUMENTS

| CN | 102223534 A | 10/2011 |
| CN | 102244784 A | 11/2011 |

OTHER PUBLICATIONS

Cherpec, V.—"Speed up your website by compressing images"—Jan. 21, 2010—pp. 1-2.*
Tencent Technology, ISRWO, PCT/CN2013/086484, Feb. 13, 2014, 15 pgs.
Tencent Technology, IPRP, PCT/CN2013/086484, May 19, 2015, 14 pgs.

* cited by examiner

METHOD AND APPARATUS FOR LOSSLESS IMAGE COMPRESSION

RELATED APPLICATIONS

This application is a continuation application of PCT Patent Application No. PCT/CN2013/086484, entitled "METHOD AND APPARATUS FOR LOSSLESS IMAGE COMPRESSION" filed on Nov. 4, 2013, which claims priority to Chinese Patent Application No. 201210468024.0, filed with the Chinese Patent Office on Nov. 19, 2012 and entitled "METHOD AND APPARATUS FOR LOSSLESS IMAGE COMPRESSION", both of which are incorporated herein by reference in their entirety.

FIELD OF THE TECHNOLOGY

The present disclosure relates to the field of computer technologies, and in particular, to method and apparatus for lossless image compression.

BACKGROUND OF THE DISCLOSURE

With the development of a high-resolution image acquisition device, quality of an obtained picture is increasingly higher, and contradictions between massive image data and limited storage space and between the massive image data and limited network bandwidth are increasingly prominent; therefore, to work out a better image compression method is of great significance for reducing image transmission bandwidth and the storage space.

Currently, mainstream picture storage formats are Joint Photographic Experts Group (JPEG) and Portable Network Graphics (PNG), and for picture capacity compression technologies for such two types of pictures, a manner of removing redundant information in a picture is generally used. Generally, ancillary information in a picture in a JPEG format is removed and ancillary information in an ancillary chunk in a PNG format is removed. Another compression manner is reducing resolution of a picture, to achieve an objective of reducing space occupied by the picture.

During implementation of the present disclosure, the inventor finds that the existing technology has at least the following problems:

For the picture compression manner in which ancillary information in a picture is removed, although a requirement of lossless compression can be met, picture compression efficiency is low, and compression is insufficient; and for the picture compression manner in which the resolution is reduced, lossy compression is performed, which cannot guarantee original picture data.

SUMMARY

To solve a problem in the existing technology that lossless compression of a picture is insufficient, embodiments of the present disclosure provide method and apparatus for lossless image compression. The technical solutions are described as follows:

According to one aspect, a lossless picture compression method is provided, including:

removing ancillary information and redundant information from a picture having a predefined format in a preset manner;

decompressing the picture to restore original picture data of the picture; and setting a compression parameter for the original picture data of the picture and compressing the original picture data of the picture into a picture having the same format before the picture decompression using the compression parameter.

The step of removing ancillary information and redundant information from a picture having a predefined format in a preset manner includes:

removing the ancillary information from the picture when the picture is in a JPEG format.

The step of removing ancillary information and redundant information from a picture having a predefined format in a preset manner includes:

removing the ancillary information from the picture when the picture is in a PNG format;

determining whether an ancillary chunk of the picture includes transparent channel data;

when the transparent channel data is found, removing data other than the transparent channel data in the ancillary chunk of the picture as redundant data from the picture, and modifying a red green blue (RGB) color value of a transparent pixel in the transparent channel data in the picture to a preset color value; and when the transparent channel data is not found, removing the ancillary chunk of the picture as redundant data from the picture.

The step of setting a compression parameter for the original picture data of the picture and compressing the original picture data of the picture into a picture having the same format before the picture decompression using the compression parameter includes:

when the format before the picture decompression is a JPEG format, setting a compression parameter in a progressive JPEG format for the original picture data of the picture whose resolution is greater than a preset resolution; and setting a compression parameter of Huffman coding and compressing the original picture data of the picture using the compression parameter.

The step of setting a compression parameter for the original picture data of the picture and compressing the original picture data of the picture into a picture having the same format before the picture decompression using the compression parameter includes:

when the format before the picture decompression is a PNG format, selecting multiple combinations of preset filter types and preset compression parameters, compressing the picture using the multiple combinations, and selecting, after a preset number of times, a result with a maximum compression rate as a result after the compression.

Before the step of setting a compression parameter for the original picture data of the picture and compressing the original picture data of the picture into a picture having the same format before the picture decompression using the compression parameter, the method further includes:

when the format before the picture decompression is the PNG format, converting original picture data of the picture whose color depth parameter is less than or equal to a preset number of bits and PNG type is a non-palette type in the original picture data of the picture, into a palette type;

querying whether a palette chunk in a key chunk of a picture whose PNG type is the palette type in the original picture data of the picture includes a duplicated entry, and/or whether an entry that does not correspond to a pixel color value exists in the palette chunk of the key chunk;

when the duplicated entry exists, removing the duplicated entry from the palette chunk of the key chunk; and when the entry that does not correspond to a pixel color value exists, removing the entry that does not correspond to a pixel color value from the palette chunk of the key chunk.

According to another aspect, a lossless picture compression apparatus is provided, the apparatus including one or more processors, memory, and a plurality of program modules stored in the memory and to be executed by the one or more processors, the plurality of program modules further including:

a first removal module, configured to remove ancillary information and redundant information from a picture having a predefined format in a preset manner;

a decompression module, configured to decompress the picture to restore original picture data of the picture; and a compression module, configured to set a compression parameter for the original picture data of the picture and compress the original picture data of the picture into a picture having the same format before the picture decompression using the compression parameter.

The first removal module includes:

a first removal unit, configured to remove the ancillary information from the picture when the picture is in a JPEG format.

The first removal module includes:

a second removal unit, configured to remove the ancillary information from the picture when the picture is in a PNG format;

a determining unit, configured to determine whether an ancillary chunk of the picture includes transparent channel data;

a third removal unit, configured to: when the transparent channel data is found, remove data other than the transparent channel data in the ancillary chunk of the picture as redundant data from the picture, and modify an RGB color value of a transparent pixel in the transparent channel data in the picture to a preset color value; and a fourth removal unit, configured to: when the transparent channel data is not found, remove the ancillary chunk of the picture as redundant data from the picture.

The compression module includes:

a setting unit, configured to: when the format before the picture decompression is a JPEG format, set a compression parameter in a progressive JPEG format for the original picture data of the picture whose resolution is greater than a preset resolution; and a first compression unit, configured to set a compression parameter of Huffman coding, and compress the original picture data of the picture.

The compression module includes:

a second compression unit, configured to: when the format before the picture decompression is a PNG format, selecting multiple combinations of preset filter types and preset compression parameters, compressing the picture using the multiple combinations, and select, after a preset number of times, a result with a maximum compression rate as a result after the compression.

The apparatus further includes:

a conversion module, configured to: when the format before the picture decompression is the PNG format, convert original picture data of the picture whose color depth parameter is less than or equal to a preset number of bits and PNG type is a non-palette type in the original picture data of the picture, into a palette type;

a query module, configured to query whether a palette chunk in a key chunk of a picture whose PNG type is the palette type in the original picture data of the picture includes a duplicated entry, and/or whether an entry that does not correspond to a pixel color value exists in the palette chunk of the key chunk;

a second removal module, configured to: when the duplicated entry exists, remove the duplicated entry from the palette chunk of the key chunk; and a third removal module, configured to: when the entry that does not correspond to a pixel color value exists, remove the entry that does not correspond to a pixel color value from the palette chunk of the key chunk.

Beneficial effects brought by the technical solutions provided by the embodiments of the present disclosure are described as follows:

Ancillary data and redundant data in a picture are removed, and after decompression is performed on the picture, the picture is compressed again according to a preset compression parameter, so that based on lossless compression, a compression rate of the picture is increased, and storage space is saved.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

In order to make objectives, technical solutions and advantages of the present disclosure clearer, the embodiments of the present disclosure are further described in detail below with reference to the accompanying drawings.

Embodiment 1

Figure 1:
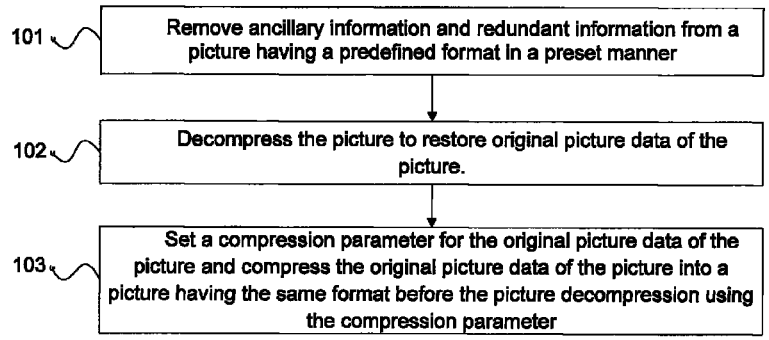
FIG. 1 is a flowchart of a lossless picture compression method according to Embodiment 1 of the present disclosure.

This embodiment of the present disclosure provides a lossless picture compression method. Referring to FIG. 1, a process of the method includes:

101: Remove ancillary information and redundant information from a picture having a predefined format in a preset manner.

102: Decompress the picture to restore original picture data of the picture.

103: Set a compression parameter for the original picture data of the picture and compress the original picture data of the picture into a picture having the same format before the picture decompression using the compression parameter.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 2

Figure 2:
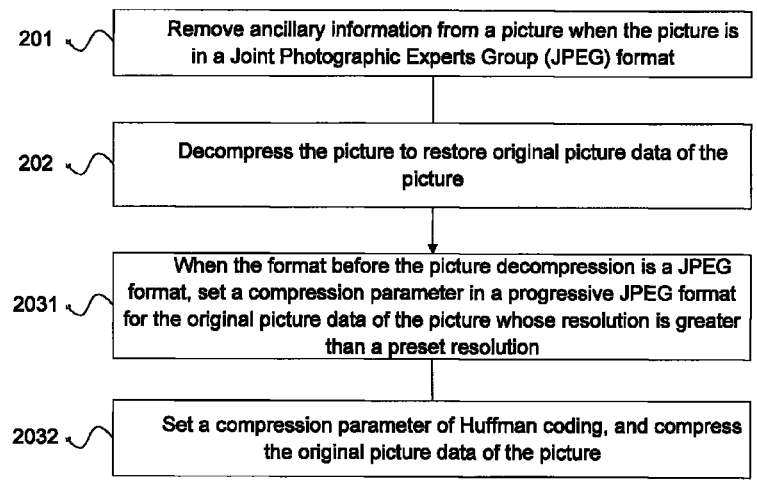
FIG. 2 is a flowchart of a lossless picture compression method according to Embodiment 2 of the present disclosure.

This embodiment of the present disclosure provides a lossless picture compression method. Referring to FIG. 2, it should be noted that, in this embodiment of the method, compression is performed when a format of a picture is JPEG.

A process of the method includes:

201: Remove ancillary information and redundant information from a picture having a predefined format in a preset manner.

In this embodiment of the present disclosure, the ancillary information is removed from the picture when the picture is in a JPEG format.

After the picture in the JPEG format is identified, the ancillary information in the picture in the JPEG format is removed, that is, some useless JPEG METADATA (metadata) is removed, where the ancillary information may include exchangeable image file (Exif) information, and the information is used to record attribute information and shooting data of a digital photo, including: various shooting conditions during shooting such as an aperture, a shutter, white balance, a light sensitivity (ISO), a focal length, and a date and a time, and a camera brand, a model, a color code, sound recorded during shooting, position information and a thumbnail that are obtained through positioning, and the like. In the Exif information, except the white balance and color code, other information and data are all irrelevant to picture display, and may be deleted. Generally, deletion of Exif information in a picture may reduce a volume of about 20 Kbit.

Further, for the ancillary information of the picture: it may also be as follows: information about some pictures that are compressed again may include comment information that is embedded into picture code in a text form, for example, description of a shooting location and a name of a photographer. Similar to the Exif information, such redundancy is also irrelevant to picture display, and does not affect the picture display after being deleted.

202: Decompress the picture to restore original picture data of the picture.

For the picture in the JPEG format from which the ancillary information has been removed, optimized compression based on Huffman coding has been performed on the picture. In this embodiment of the present disclosure, a to-be-compressed picture in the JPEG format will be compressed again, and therefore data restoration needs to be performed on the picture, to restore the data into original picture data before the picture in the JPEG format is generated originally. This process belongs to the existing technology, and details are not provided herein again.

203: Set a compression parameter for the original picture data of the picture and compress the original picture data of the picture into a picture having the same format before the picture decompression using the compression parameter.

A unified compression parameter is selected for original data of the picture, to compress the picture, thereby improving compression efficiency.

Most browsers are compatible with a picture in a progressive JPEG format, and when resolution of a picture is large, for example, for a JPEG picture whose picture resolution is greater than 500*500, after the picture is converted into the progressive JPEG format, a capacity of the picture is smaller than a capacity of a picture file in a common JPEG format.

Therefore, for the JPEG picture, deep compression may be further performed. Before the compression, if a to-be-compressed picture is not in the progressive JPEG format and resolution of the picture is greater than preset resolution, the picture is converted into the progressive JPEG format. A feature of such a picture in the progressive JPEG format is that: when the picture is browsed on a web page, a fuzzy image is displayed at the beginning, and with data being loaded, the image gradually becomes clear. Compared with a picture in the common JPEG format, the picture in the progressive JPEG format occupies less storage space on the basis of having a same display effect.

Therefore, original data of a picture whose resolution is greater than the preset resolution is selected first, and a compression parameter is set to compress it into a JPEG picture in the progressive JPEG format. Therefore, step 203 may specifically be:

2031: When the format before the picture decompression is a JPEG format, set a compression parameter in a progressive JPEG format for the original picture data of the picture whose resolution is greater than a preset resolution.

2032: Set a compression parameter of Huffman coding, and compress the original picture data of the picture.

Lossless compression is performed on the original data of the picture by using standard Huffman optimized coding. A lossless image compression process based on the Huffman coding generally includes two steps, that is, relevancy removal and encoding. The relevancy removal is removing a redundant part of image data, and reducing source entropy, which is a process of compressing the image data; and the encoding is replacing, with a new type of symbol encoding, the image data from which redundancy has been removed, which is a process of storing recoding of the image data. Compressing picture data by using the Huffman optimized coding belongs to the existing technology, and details are not provided herein again.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 3

Figure 3:
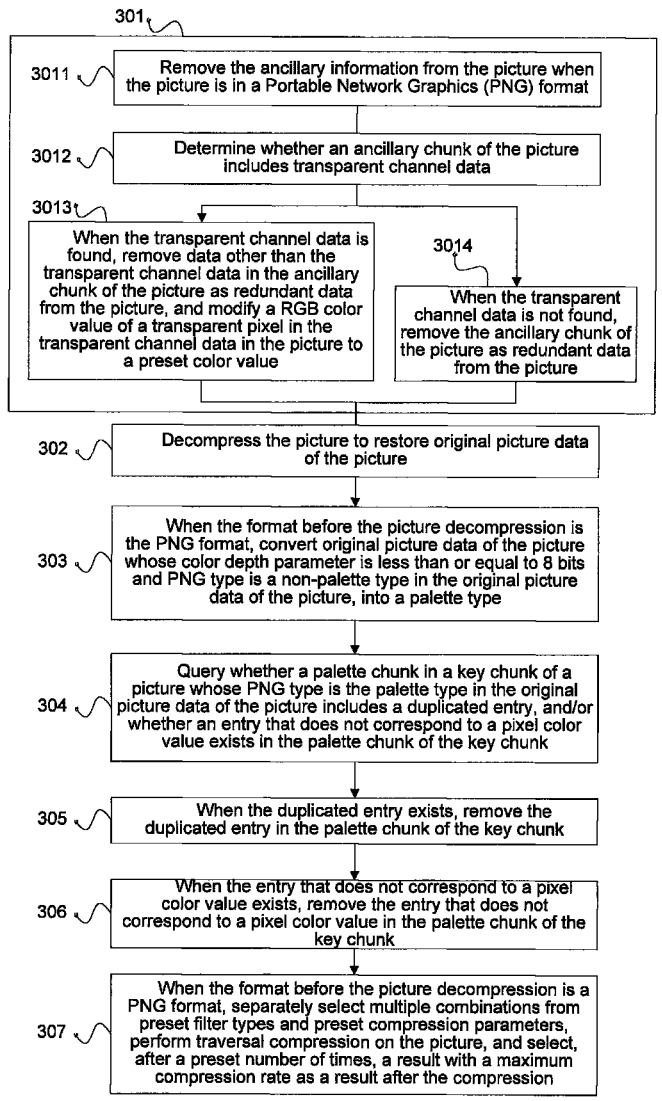
FIG. 3 is a flowchart of a lossless picture compression method according to Embodiment 3 of the present disclosure.

This embodiment of the present disclosure provides a lossless picture compression method. Referring to FIG. 3, it should be noted that, in this embodiment of the method, compression is performed when a format of a picture is PNG.

A process of the method includes:

301: Remove ancillary information and redundant information from a picture having a predefined format in a preset manner.

Specifically, the structure of a standard PNG file is formed by one PNG file identifier and several PNG chunks, as shown in Table 1:

TABLE 1

| PNG file identifier | PNG chunk | ... | PNG chunk |
|---|---|---|---|

The PNG chunk is further divided into a key chunk and an ancillary chunk, where data included in the key chunk is shown in Table 2:

TABLE 2

| Data type | Description |
|---|---|
| File header chunk IHDR | Basic information, such as an image type, a width and a height, and a color depth |
| Palette chunk PLTE | Palette color list, where the PLTE must exist for a color type 3, is optional for color types 2 and 6, and may not exist for color types 0 and 4 |
| Image chunk IDAT | Actual image data, which may include multiple consecutive IDATs (dividing the actual image data into multiple IDATs increases the size of a file, but, may generate a PNG file in streams) |
| Image end data IEND | File tail, which indicates that a PNG data stream ends |

The ancillary chunk has 14 types of data in total, which may be classified into 5 categories according to information type: transparent information (tRNS), color space information (cHRM, gAMA, iCCP, sBIT, and sRGB), text information (tEXt, zTXt, and iTXt), other information (bKGD, hIST, pHYs, and sPLT), and timestamp information (tIME). A PNG file does not necessarily include an ancillary chunk, and therefore a chunk that is irrelevant to a picture may be deleted in a compression process, for example, a text information chunk (tEXt, zTXt, and iTXt) and a timestamp information (tIME).

In most cases, the ancillary chunk is not necessarily retained. In ancillary chunk data, for a picture without transparent channel data, all ancillary chunks are removed; and for a picture whose ancillary chunk data includes transparent channel data, all ancillary chunk data except tRNS data is removed, and an RGB color value of a pixel in a transparent state is modified; and tRNS is a transparent chunk of an image, and stores relevant information of a transparent channel.

Step 301 may specifically be:

3011: Remove the ancillary information from the picture when the picture is in a PNG format.

The ancillary information removed in this step is the same as the ancillary information removed from the picture in the JPEG format in step 201, and details are not provided herein again.

3012: Determine whether an ancillary chunk of the picture includes transparent channel data.

3013: When the transparent channel data is found, remove data other than the transparent channel data in the ancillary chunk of the picture as redundant data from the picture, and modify a RGB color value of a transparent pixel in the transparent channel data in the picture to a preset color value.

It can be known, according to transparency information of pixels that is correspondingly stored in the transparent channel data, which pixels in the picture are completely transparent. Therefore, for a transparent pixel, regardless of a color to which an original RGB color value corresponds, the color corresponding to the pixel is not displayed when the pixel is displayed in the picture, but the pixel is displayed to be completely transparent according to a corresponding transparency attribute of the pixel in transparency information of the PNG picture, and the color value is invisible, which is useless to an RGB color value correspondingly stored for the pixel; therefore, the RGB color value corresponding to the pixel can be modified to (0, 0, 0), reducing storage space.

3014: When the transparent channel data is not found, remove the ancillary chunk of the picture as redundant data from the picture.

302: Decompress the picture to restore original picture data of the picture.

For a picture in the PNG format that needs to be compressed, optimized compression based on Huffman coding has been performed on the picture. In this embodiment of the present disclosure, a to-be-compressed picture in the PNG format will be compressed again, and therefore data restoration needs to be performed on the picture, to restore the data into original picture data before the picture in the PNG format is generated originally. This process belongs to the existing technology, and details are not provided herein again.

303: When the format before the picture decompression is the PNG format, convert original picture data of the picture whose color depth parameter is less than or equal to a preset number of bits and PNG type is a non-palette type in the original picture data of the picture, into a palette type.

A size of the preset bits may be 8 bits. Certainly, beside 8 bits, the size of the preset bits may also be 16 bits or 24 bits. In this embodiment, the size of the preset bits is not specifically limited.

A PNG type used by many pictures in the PNG format is PNG24/PNG32 (four channels of RGBA, where each channel has 8 bits, and each pixel has 24 to 32 bits); and if the number of colors stored in a picture is less than 256, storage may be performed by using PNG8 (each pixel has 8 bits) of the palette type. For a picture that has a lot of pixels, this can increase a compression rate to a great extent.

A color value of each pixel in the picture of the palette type is changed from the previously stored RGB value to a pixel index of the pixel. However, all colors included in the picture are stored in palette data in key chunk data of the picture, and all color information in the picture is stored in the palette chunk.

304: Query whether a palette chunk in a key chunk of a picture whose PNG type is the palette type in the original picture data of the picture includes a duplicated entry, and/or whether an entry that does not correspond to a pixel color value exists in the palette chunk of the key chunk.

In the picture in the PNG format after the decompression, the redundant information in the key chunk of the picture may be removed, that is, the redundant information in the palette chunk in the key chunk is removed. The palette chunk PLTE is one of four key chunks in the picture in the PNG format, and is used to store all color values corresponding to pixels in the picture in the PNG format and of the palette type.

Reducing the palette chunk includes content in two aspects: removing the duplicated entry and entries that do not correspond to color values of the pixels. Redundant duplicated entries refer to duplicated entries that indicate a same RGB value. If a palette of a PNG image includes a duplicated color value or a color value that has not been used, it indicates that palette chunks of these color values may be removed.

305: When the duplicated entry exists, remove the duplicated entry from the palette chunk of the key chunk.

306: When the entry that does not correspond to a pixel color value exists, remove the entry that does not correspond to a pixel color value from the palette chunk of the key chunk.

307: Set a compression parameter for the original picture data of the picture and compress the original picture data of the picture into a picture having the same format before the picture decompression using the compression parameter.

In this embodiment of the present disclosure, when the format before the picture decompression is a PNG format, multiple combinations of preset filter types and preset compression parameters are selected, the picture is compressed using the multiple combinations, and after a preset number of times, a result with a maximum compression rate is selected as a result after the compression.

In a compression system corresponding to the PNG format, there are several selectable parameters, for example, a PNG filter and a Zlib parameter. A PNG default parameter does not necessarily enable each picture to be compressed into its minimum, and therefore each selectable parameter value is tried in a traversal manner, to find a configuration that makes the picture occupy minimum storage space.

A preset filter type is specifically that: a method for filtering a picture in the PNG format defines 5 basic filter types, and selecting an appropriate filter type for the picture increases the compression rate. These types include: type 0: no filtering; type 1: Sub filtering, that is, a filtering result is a difference between this pixel and a previous (left) pixel; type 2: Up filtering, that is, a filtering result is a difference between this pixel and a pixel on a previous scanning line (upper); type 3: Average filtering, where a pixel value is predicted by using an average value of left and upper pixels; type 4: Paeth filtering, where a simple linear function calculation is performed by using the left pixel, the upper pixel, and an upper left pixel, and then a pixel closest to a preset value is selected, and used as the filtering result.

The preset compression parameters are: Zlib, which is a function library for data compression, and deflate, which is a variant algorithm that uses lossless compression LZ77, where a PNG image chunk IDAT is generally compressed by using Zlib-deflate. Deflate has the following 4 parameters, which affect a size of a compressed file: a compression level (Zlib Compression Level), a compression strategy (Zlib Compression Strategy), a memory level (Zlib Memory Level), and a floating window size (Zlib Window Size). Several values are selectable separately for these 4 parameters.

N different combinations of the PNG filter types and the compression parameters are selected in a traversal manner, and a result with a maximum compression rate is output as a final result. The selection of the filter types and the Zlib compression parameters greatly affects a compression effect. However, there are many different combinations of parameters thereof, and to try every combination is very time-consuming. Preferably, it is found through experiments that, obtained final compression rates are not very different when certain combinations of parameters are tried and all combinations of parameters are tried, and the number of traversal times is currently selected to be 24.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 4

Figure 4:
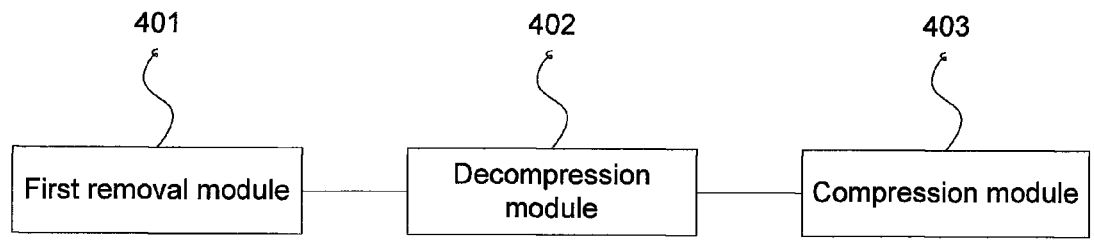
FIG. 4 is a schematic structural diagram of a lossless picture compression apparatus according to Embodiment 4 of the present disclosure.

This embodiment of the present disclosure provides a lossless picture compression apparatus. Referring to FIG. 4, the apparatus includes:

a first removal module 401, configured to remove ancillary information and redundant information from a picture having a predefined format in a preset manner;

a decompression module 402, configured to decompress the picture to restore original picture data of the picture; and a compression module 403, configured to set a compression parameter for the original picture data of the picture and compress the original picture data of the picture into a picture having the same format before the picture decompression using the compression parameter.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 5

Figure 5:
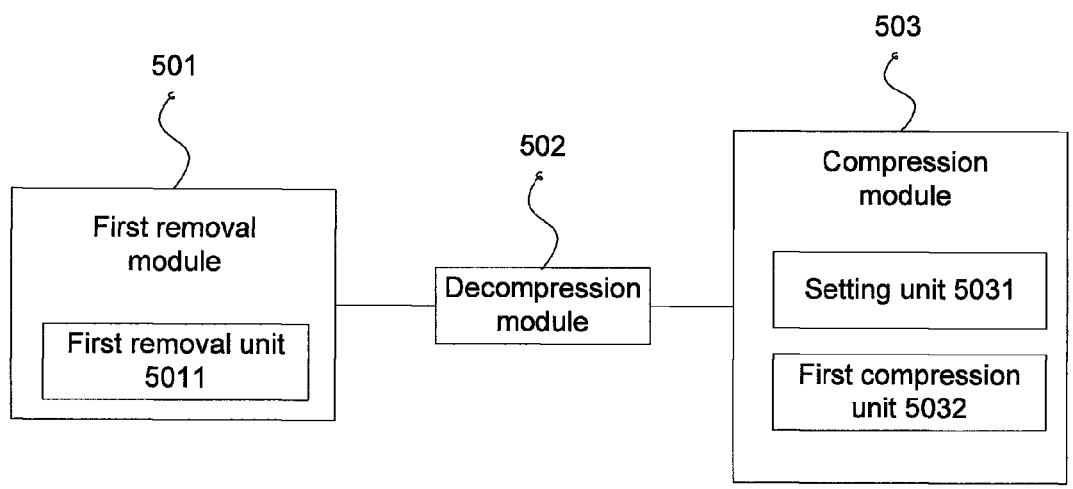
FIG. 5 is a schematic structural diagram of a lossless picture compression apparatus according to Embodiment 5 of the present disclosure.

This embodiment of the present disclosure provides a lossless picture compression apparatus. Referring to FIG. 5, the apparatus includes:

a first removal module 501, configured to remove ancillary information and redundant information from a picture having a predefined format in a preset manner;

a decompression module 502, configured to decompress the picture to restore original picture data of the picture; and a compression module 503, configured to set a compression parameter for the original picture data of the picture and compress the original picture data of the picture into a picture having the same format before the picture decompression using the compression parameter.

In the specific implementation, the first removal module 501 includes:

a first removal unit 5011, configured to remove the ancillary information from the picture when the picture is in a JPEG format.

The compression module 503 includes:

a setting unit 5031, configured to: when the format before the picture decompression is a JPEG format, set a compression parameter in a progressive JPEG format for the original picture data of the picture whose resolution is greater than a preset resolution; and a first compression unit 5032, configured to set a compression parameter of Huffman coding, and compress the original picture data of the picture.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 6

Figure 6:
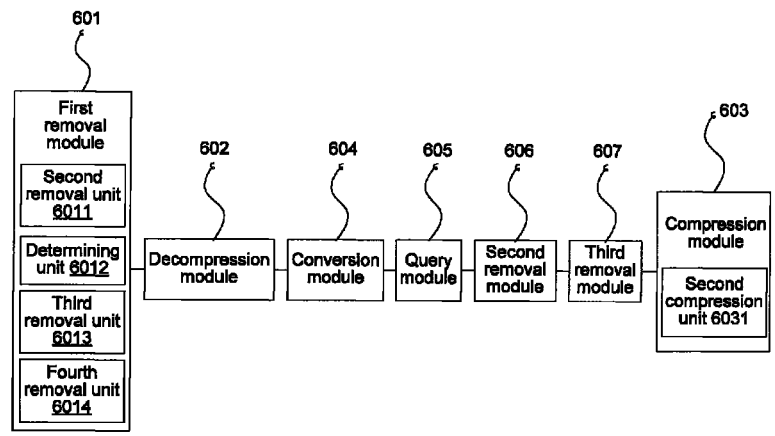
FIG. 6 is a schematic structural diagram of a lossless picture compression apparatus according to Embodiment 6 of the present disclosure.

This embodiment of the present disclosure provides a lossless picture compression apparatus. Referring to FIG. 6, the apparatus includes:

a first removal module 601, configured to remove ancillary information and redundant information from a picture having a predefined format in a preset manner;

a decompression module 602, configured to decompress the picture to restore original picture data of the picture; and a compression module 603, configured to set a compression parameter for the original picture data of the picture and compress the original picture data of the picture into a picture having the same format before the picture decompression using the compression parameter.

In the specific implementation, the first removal module 601 includes:

a second removal unit 6011, configured to remove the ancillary information from the picture when the picture is in a PNG format;

a determining unit 6012, configured to determine whether an ancillary chunk of the picture includes transparent channel data;

a third removal unit 6013, configured to: when the transparent channel data is found, remove data other than the transparent channel data in the ancillary chunk of the picture as redundant data from the picture, and modify an RGB color value of a transparent pixel in the transparent channel data in the picture to a preset color value; and a fourth removal unit 6014, configured to: when the transparent channel data is not found, remove the ancillary chunk of the picture as redundant data from the picture.

The compression module 603 includes:

a second compression unit 6031, configured to: when the format before the picture decompression is a PNG format, selecting multiple combinations of preset filter types and preset compression parameters, compressing the picture using the multiple combinations, and select, after a preset number of times, a result with a maximum compression rate as a result after the compression.

The apparatus further includes:

a conversion module 604, configured to: when the format before the picture decompression is the PNG format, convert original picture data of the picture whose color depth parameter is less than or equal to a preset number of bits and PNG type is a non-palette type in the original picture data of the picture, into a palette type;

a query module 605, configured to query whether a palette chunk in a key chunk of a picture whose PNG type is the palette type in the original picture data of the picture includes a duplicated entry, and/or whether an entry that does not correspond to a pixel color value exists in the palette chunk of the key chunk;

a second removal module 606, configured to: when the duplicated entry exists, remove the duplicated entry from the palette chunk of the key chunk; and a third removal module 607, configured to: when the entry that does not correspond to a pixel color value exists, remove the entry that does not correspond to a pixel color value from the palette chunk of the key chunk.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 7

Figure 7:
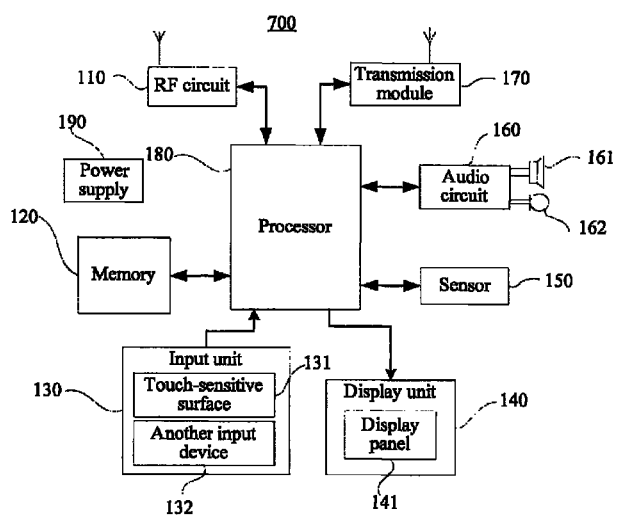
FIG. 7 is a schematic structural diagram of a terminal according to Embodiment 7 of the present disclosure.

For a schematic structural diagram of a terminal according to an embodiment of the present disclosure, FIG. 7 shows a schematic structural diagram of a terminal having a touch-sensitive surface involved in an embodiment of the present disclosure. The terminal may be configured to implement the lossless picture compression method provided by the foregoing embodiments.

The terminal 700 may include components such as a radio frequency (RF) circuit 110, a memory 120 including one or more non-transitory computer readable storage medium, an input unit 130, a display unit 140, a sensor 150, an audio circuit 160, a transmission module 170, a processor 180 including one or more processing cores, and a power supply 190. A person skilled in the art may understand that, the structure of the terminal shown in FIG. 7 does not constitute a limitation to the terminal, and may include more components or fewer components than those shown those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to the one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module, for example, a software program and module that correspond to the apparatus for increasing a running speed of an application program in Embodiment 3. The processor 180 executes different functional applications and performs data processing by running the software program and module stored in the memory 120, for example, increasing a running speed of an application program. The memory 120 may mainly include a program storage area and a data storage area. The program storage area may store an operating system, an application program required by at least one function (such as a voice playback function and an image playback function), and the like. The data storage area may store data (such as audio data and an address book) created according to use of the terminal 700, and the like. In addition, the memory 120 may include a high speed random access memory, and may also include a non-volatile memory, such as at least one magnetic disk storage device, a flash memory, or another volatile solid-state memory. Correspondingly, the memory 120 may further include a memory controller, so as to provide access to of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 700. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 7, the touch-sensitive surface 131 and the display panel 141 are used as two separate parts to implement input and output functions, in some embodiments, the touch-sensitive surface 131 and the display panel 141 may be integrated to implement the input and output functions.

The terminal 700 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 700, are not further described herein.

The audio circuit 160, a loudspeaker 161, and a microphone 162 may provide audio interfaces between the user and the terminal 700. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 700.

The terminal 700 may help, by using the transmission module 170, a user to receive and send e-mails, browse a web page, access streaming media, and so on, which provides wireless or wired broadband Internet access for the user. Although FIG. 7 shows the transmission module 170, it may be understood that, the transmission module 170 is not a necessary component of the terminal 700, and when required, the transmission module 170 may be omitted as long as the scope of the essence of the present disclosure is not changed.

The processor 180 is the control center of the terminal 700, and is connected to various parts of the mobile phone by using various interfaces and lines. By running or executing the software program and/or module stored in the memory 120, and invoking data stored in the memory 120, the processor 180 performs various functions and data processing of the terminal 700, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 700 may further include a camera, a Bluetooth module, and the like, which are not further described herein. Specifically, in this embodiment, the display unit of the terminal is a touch screen display, and the terminal further includes a memory and one or more programs. The one or more programs are stored in the memory, and configured to be executed by the one or more processors. The one or more programs include instructions for performing the following operations:

removing ancillary information and redundant information from a picture having a predefined format in a preset manner;

decompressing the picture to restore original picture data of the picture; and setting a compression parameter for the original picture data of the picture and compressing the original picture data of the picture into a picture having the same format before the picture decompression using the compression parameter.

It is assumed that the foregoing is a first possible implementation manner, and then in a second possible implementation manner that is provided based on the first possible implementation manner, the memory of the terminal further includes an instruction for performing the following operation:

removing the ancillary information from the picture when the picture is in a JPEG format.

In a third possible implementation manner that is provided based on the first possible implementation manner, the memory of the terminal further includes instructions for performing the following operations:

removing the ancillary information from the picture when the picture is in a PNG format;

determining whether an ancillary chunk of the picture includes transparent channel data;

when the transparent channel data is found, removing data other than the transparent channel data in the ancillary chunk of the picture as redundant data from the picture, and modifying an RGB color value of a transparent pixel in the transparent channel data in the picture to a preset color value; and when the transparent channel data is not found, removing the ancillary chunk of the picture as redundant data from the picture.

In a fourth possible implementation manner that is provided based on the first possible implementation manner, the memory of the terminal further includes instructions for performing the following operations:

when the format before the picture decompression is a JPEG format, setting a compression parameter in a progressive JPEG format for the original picture data of the picture whose resolution is greater than a preset resolution; and setting a compression parameter of Huffman coding and compressing the original picture data of the picture using the compression parameter.

In a fifth possible implementation manner that is provided based on the first possible implementation manner, the memory of the terminal further includes an instruction for performing the following operation:

when the format before the picture decompression is a PNG format, selecting multiple combinations of preset filter types and preset compression parameters, compressing the picture using the multiple combinations, and selecting, after a preset number of times, a result with a maximum compression rate as a result after the compression.

In a sixth possible implementation manner that is provided based on the fifth possible implementation manner, the memory of the terminal further includes instructions for performing the following operations:

when the format before the picture decompression is the PNG format, converting original picture data of the picture whose color depth parameter is less than or equal to a preset number of bits and PNG type is a non-palette type in the original picture data of the picture, into a palette type;

querying whether a palette chunk in a key chunk of a picture whose PNG type is the palette type in the original picture data of the picture includes a duplicated entry, and/or whether an entry that does not correspond to a pixel color value exists in the palette chunk of the key chunk;

when the duplicated entry exists, removing the duplicated entry from the palette chunk of the key chunk; and when the entry that does not correspond to a pixel color value exists, removing the entry that does not correspond to a pixel color value from the palette chunk of the key chunk.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 8

An embodiment of the present disclosure provides a computer readable storage medium, where the computer readable storage medium may be a computer readable storage medium included in the memory in the foregoing embodiment, and may also be a computer readable storage medium that exists separately and is not assembled into the terminal. One or more programs are stored in the computer readable storage medium, the one or more programs are used by one or more processors to perform a lossless picture compression method, and the method includes:

removing ancillary information and redundant information from a picture having a predefined format in a preset manner;

decompressing the picture to restore original picture data of the picture; and setting a compression parameter for the original picture data of the picture and compressing the original picture data of the picture into a picture having the same format before the picture decompression using the compression parameter.

It is assumed that the foregoing is a first possible implementation manner, and then in a second possible implementation manner that is provided based on the first possible implementation manner, the removing ancillary information and redundant information from a picture having a predefined format in a preset manner includes:

removing the ancillary information from the picture when the picture is in a JPEG format.

In a third possible implementation manner that is provided based on the first possible implementation manner, the removing ancillary information and redundant information from a picture having a predefined format in a preset manner includes:

removing the ancillary information from the picture when the picture is in a PNG format;

determining whether an ancillary chunk of the picture includes transparent channel data;

when the transparent channel data is found, removing data other than the transparent channel data in the ancillary chunk of the picture as redundant data from the picture, and modifying an RGB color value of a transparent pixel in the transparent channel data in the picture to a preset color value; and when the transparent channel data is not found, removing the ancillary chunk of the picture as redundant data from the picture.

In a fourth possible implementation manner that is provided based on the first possible implementation manner, the setting a compression parameter for the original picture data of the picture and compressing the original picture data of the picture into a picture having the same format before the picture decompression using the compression parameter includes:

when the format before the picture decompression is a JPEG format, setting a compression parameter in a progressive JPEG format for the original picture data of the picture whose resolution is greater than a preset resolution; and setting a compression parameter of Huffman coding and compressing the original picture data of the picture using the compression parameter.

In a fifth possible implementation manner that is provided based on the first possible implementation manner, the setting a compression parameter for the original picture data of the picture and compressing the original picture data of the picture into a picture having the same format before the picture decompression using the compression parameter includes:

when the format before the picture decompression is a PNG format, selecting multiple combinations of preset filter types and preset compression parameters, compressing the picture using the multiple combinations, and selecting, after a preset number of times, a result with a maximum compression rate as a result after the compression.

In a sixth possible implementation manner that is provided based on the fifth possible implementation manner, before the setting a compression parameter for the original picture data of the picture and compressing the original picture data of the picture into a picture having the same format before the picture decompression using the compression parameter, the method further includes:

when the format before the picture decompression is the PNG format, converting original picture data of the picture whose color depth parameter is less than or equal to a preset number of bits and PNG type is a non-palette type in the original picture data of the picture, into a palette type;

querying whether a palette chunk in a key chunk of a picture whose PNG type is the palette type in the original picture data of the picture includes a duplicated entry, and/or whether an entry that does not correspond to a pixel color value exists in the palette chunk of the key chunk;

when the duplicated entry exists, removing the duplicated entry from the palette chunk of the key chunk; and when the entry that does not correspond to a pixel color value exists, removing the entry that does not correspond to a pixel color value from the palette chunk of the key chunk.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

Embodiment 9

In this embodiment of the present disclosure, a graphical user interface is provided. The graphical user interface is used on a terminal, the terminal includes a touch screen display, a memory, and one or more processors for executing one or more programs, and the graphical user interface includes:

removing, on the touch screen display, ancillary information and redundant information from a picture having a predefined format in a preset manner;

decompressing the picture to restore original picture data of the picture; and setting a compression parameter for the original picture data of the picture and compressing the original picture data of the picture into a picture having the same format before the picture decompression using the compression parameter.

According to this embodiment of the present disclosure, ancillary data and redundant data in a picture are removed, and after decompression is performed on the picture, the picture is compressed again according to a preset compression parameter, so that based on lossless compression, a compression rate of the picture is increased, and storage space is saved.

It should be noted that the above functional modules are only described for exemplary purposes when the lossless picture compression apparatus provided by the foregoing embodiments compresses a picture in a lossless manner. In actual applications, the functions may be allocated to different functional modules according to specific needs, which means that the internal structure of the apparatus is divided to different functional modules to complete all or some of the above described functions. In addition, the lossless picture compression apparatus provided by the foregoing embodiments is based on the same concept as the lossless picture compression method in the foregoing embodiments. For the specific implementation process, refer to the method embodiments, and the details are not described herein again.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A lossless picture compression method, comprising:
at a computing device having one or more processors and memory for storing program modules to be executed by the one or more processors:
removing ancillary information and redundant information from a picture having a predefined Portable Network Graphics (PNG) format in a preset manner;
decompressing the picture to restore original picture data of the picture;
converting the original picture data of the picture whose color depth parameter is less than or equal to a preset number of bits and PNG type is a non-palette type in the original picture data of the picture, into a palette type;
querying whether a palette chunk in a key chunk of the picture whose PNG type is the palette type in the original picture data of the picture comprises a duplicated entry, and/or whether an entry that does not correspond to a pixel color value exists in the palette chunk of the key chunk;
when the duplicated entry exists, removing the duplicated entry from the palette chunk of the key chunk; and
when the entry that does not correspond to a pixel color value exists, removing the entry that does not correspond to a pixel color value from the palette chunk of the key chunk; and
setting a compression parameter for the original picture data of the picture and compressing the original picture data of the picture into a picture having the same format before the picture decompression using the compression parameter, further comprising:
selecting multiple combinations of preset filter types and preset compression parameters, compressing the picture using the multiple combinations, and selecting, after a preset number of times, a result with a maximum compression rate as a result after the compression.

2. The method according to claim 1, wherein the step of removing ancillary information and redundant information from a picture having a predefined format in a preset manner comprises:
removing the ancillary information from the picture;
determining whether an ancillary chunk of the picture comprises transparent channel data;
when the transparent channel data is found, removing data other than the transparent channel data in the ancillary chunk of the picture as redundant data from the picture, and modifying a red green blue (RGB) color value of a transparent pixel in the transparent channel data in the picture to a preset color value; and
when the transparent channel data is not found, removing the ancillary chunk of the picture as redundant data from the picture.

3. A lossless picture compression apparatus, comprising:
one or more processors;
memory; and
a plurality of program modules stored in the memory and to be executed by the one or more processors, the plurality of program modules further including:
a first removal module, configured to remove ancillary information and redundant information from a picture having a predefined Portable Network Graphics (PNG) format in a preset manner;
a decompression module, configured to decompress the picture to restore original picture data of the picture;
a conversion module, configured to: convert the original picture data of the picture whose color depth parameter is less than or equal to a preset number of bits and PNG type is a non-palette type in the original picture data of the picture, into a palette type;
a query module, configured to query whether a palette chunk in a key chunk of a picture whose PNG type is the palette type in the original picture data of the picture comprises a duplicated entry, and/or whether an entry that does not correspond to a pixel color value exists in the palette chunk of the key chunk;
a second removal module, configured to: when the duplicated entry exists, remove the duplicated entry from the palette chunk of the key chunk;
a third removal module, configured to: when the entry that does not correspond to a pixel color value exists, remove the entry that does not correspond to a pixel color value from the palette chunk of the key chunk; and
a compression module, configured to set a compression parameter for the original picture data of the picture and compress the original picture data of the picture into a picture having the same format before the picture decompression using the compression parameter, the compression module further including:
a second compression unit, configured to: select multiple combinations of preset filter types and preset compression parameters, compress the picture using the multiple combinations, and select, after a preset number of times, a result with a maximum compression rate as a result after the compression.

4. The apparatus according to claim 3, wherein the first removal module comprises:
a second removal unit, configured to remove the ancillary information from the picture;
a determining unit, configured to determine whether an ancillary chunk of the picture comprises transparent channel data;
a third removal unit, configured to: when the transparent channel data is found, remove data other than the transparent channel data in the ancillary chunk of the picture as redundant data from the picture, and modify a red green blue (RGB) color value of a transparent pixel in the transparent channel data in the picture to a preset color value; and
a fourth removal unit, configured to: when the transparent channel data is not found, remove the ancillary chunk of the picture as redundant data from the picture.

5. A non-transitory computer readable storage medium storing a plurality of program modules, the plurality of program modules being executed by one or more processors of a computing device to perform a lossless picture compression method, and the plurality of program modules further including:
a first removal module, configured to remove ancillary information and redundant information from a picture having a predefined Portable Network Graphics (PNG) format in a preset manner;
a decompression module, configured to decompress the picture to restore original picture data of the picture;
a conversion module, configured to: convert the original picture data of the picture whose color depth parameter is less than or equal to a preset number of bits and PNG type is a non-palette type in the original picture data of the picture, into a palette type; and
a query module, configured to query whether a palette chunk in a key chunk of a picture whose PNG type is the palette type in the original picture data of the picture comprises a duplicated entry, and/or whether an entry that does not correspond to a pixel color value exists in the palette chunk of the key chunk;
a second removal module, configured to: when the duplicated entry exists, remove the duplicated entry from the palette chunk of the key chunk;
a third removal module, configured to: when the entry that does not correspond to a pixel color value exists, remove the entry that does not correspond to a pixel color value from the palette chunk of the key chunk; and
a compression module, configured to set a compression parameter for the original picture data of the picture and compress the original picture data of the picture into a picture having the same format before the picture decompression using the compression parameter, the compression module further including:
a second compression unit, configured to: select multiple combinations of preset filter types and preset compression parameters, compress the picture using the multiple combinations, and select, after a preset number of times, a result with a maximum compression rate as a result after the compression.

6. The non-transitory computer readable storage medium according to claim 5, wherein the first removal module comprises:
a second removal unit, configured to remove the ancillary information from the picture;
a determining unit, configured to determine whether an ancillary chunk of the picture comprises transparent channel data;

a third removal unit, configured to: when the transparent channel data is found, remove data other than the transparent channel data in the ancillary chunk of the picture as redundant data from the picture, and modify a red green blue (RGB) color value of a transparent pixel in the transparent channel data in the picture to a preset color value; and a fourth removal unit, configured to: when the transparent channel data is not found, remove the ancillary chunk of the picture as redundant data from the picture.

* * * * *